United States Patent [19]

Naito

[11] Patent Number: 4,521,687

[45] Date of Patent: Jun. 4, 1985

[54] MASS SPECTROMETER

[75] Inventor: Motohiro Naito, Akishimashi, Japan

[73] Assignee: Jeol Ltd., Tokyo, Japan

[21] Appl. No.: 458,756

[22] Filed: Jan. 17, 1983

[51] Int. Cl.[3] .............................................. B01D 59/44

[52] U.S. Cl. .................................... 250/296; 250/282; 250/283; 250/294

[58] Field of Search ............... 250/281, 282, 283, 294, 250/296

[56] References Cited

U.S. PATENT DOCUMENTS

| | | | |
|---|---|---|---|
| 3,610,921 | 10/1971 | Major | 250/283 |
| 3,673,404 | 6/1972 | Major | 250/282 |
| 3,769,513 | 10/1973 | Delany | 250/283 |
| 3,803,410 | 4/1974 | Banner | 250/281 |
| 4,054,796 | 10/1977 | Naito | 250/294 |

*Primary Examiner*—Bruce C. Anderson
*Attorney, Agent, or Firm*—Webb, Burden, Robinson & Webb

[57] ABSTRACT

A mass spectrometer and process for using same comprises an ion source, a first field, a second field and a field-free region between the first and second fields. Parent ions are mass-selected by said first field and daughter ions are formed in the field-free region by ion dissociation or ion fragmentation. The daughter ions are dispersed by the second field. Superimposed electric and magnetic fields are used as the second field, the intensity of said magnetic field being changed from a first stage to a second stage and the intensity of said electric field being swept under both stages. Both energy and mass of the daughter ions can be measured by this mass spectrometer.

6 Claims, 3 Drawing Figures

MASS SPECTROMETER

BACKGROUND OF THE INVENTION

This invention relates to a mass spectrometer and process of using same capable of measuring both energy and mass of daughter ions formed by dissociation or fragmentation of parent ions.

It is known that the measurement of ion dissociations or ion fragmentations is effective for analyzing constitutive property of organic compounds or organic mixtures. In the conventional apparatus for measuring ion dissociations or ion fragmentations, ions produced and accelerated by an ion source are selected according to their mass to charge ratio by a first field such as a magnetic field or double-focussing field. The mass-selected parent ions, which have a desired m/e ratio, are directed to a collision chamber in a field-free region and collide with inert gas, such as helium gas, supplied in the chamber, thereby a part of the parent ions forming daughter ions. The daughter ions are also formed in the field-free region without the collision chamber by the self fragmentation reaction of the parent ion. The daughter ions are directed to a second field such as an electric field or double-focussing field. In the case of using the electric field as the second field, the daughter ions can be precisely selected according to their kinetic energy. However, spectrum width of the kinetic energy of any daughter ion is broad, since a part of internal energy of the parent ion is released at the dissociation. Therefore, the mass of the daughter ion cannot be measured at high resolution.

In the case of using the double-focussing field as the second field, the mass spectrum of the daughter ions can be obtained at high resolution, since the daughter ions are double-focussed by the field. However, the daughter ions having various kinetic energies are focussed on an ion collector at the same time under certain field conditions if these daughter ions have same mass. Therefore, the kinetic energy spectrum of the daughter ions cannot be obtained in this case.

SUMMARY OF THE INVENTION

The object of the present invention is to provide a mass spectrometer capable of measuring both kinetic energy and mass of daughter ions.

How the aforegoing object is attained will become apparent by reading the following systematic exposition.

Briefly, this inveniton relates to improvement in a mass spectrometer and process of using same in which ions produced and accelerated by an ion source are selected by a first field according to their mass to charge ratio, the mass-selected parent ions passing through a field-free region. Some of the parent ions form daughter ions by dissociation or fragmentation in the field-free region. In one embodiment of this invention, the parent ions are directed to a collision chamber which is arranged in said field-free region, to which inert gas is fed, so as to form the daughter ions by collision induced dissociation. The mixed ions (the daughter ions and the remained parent ions) are directed to superimposed electric and magnetic fields at right angles. The magnetic field intensity is changed from a first level to a second level. The intensity of electric field is swept under both magnetic intensity levels. The ions selected by the superimposed field are detected by an ion collector. Both energy and mass of daughter ions are obtained by processing two kinds of detected signals.

BRIEF DESCRIPTION OF THE DRAWINGS

The following describes this invention in detail with reference to accompanying drawings of which.

DESCRIPTION OF THE PREFERRED EMBODIMENT

Figure 1:
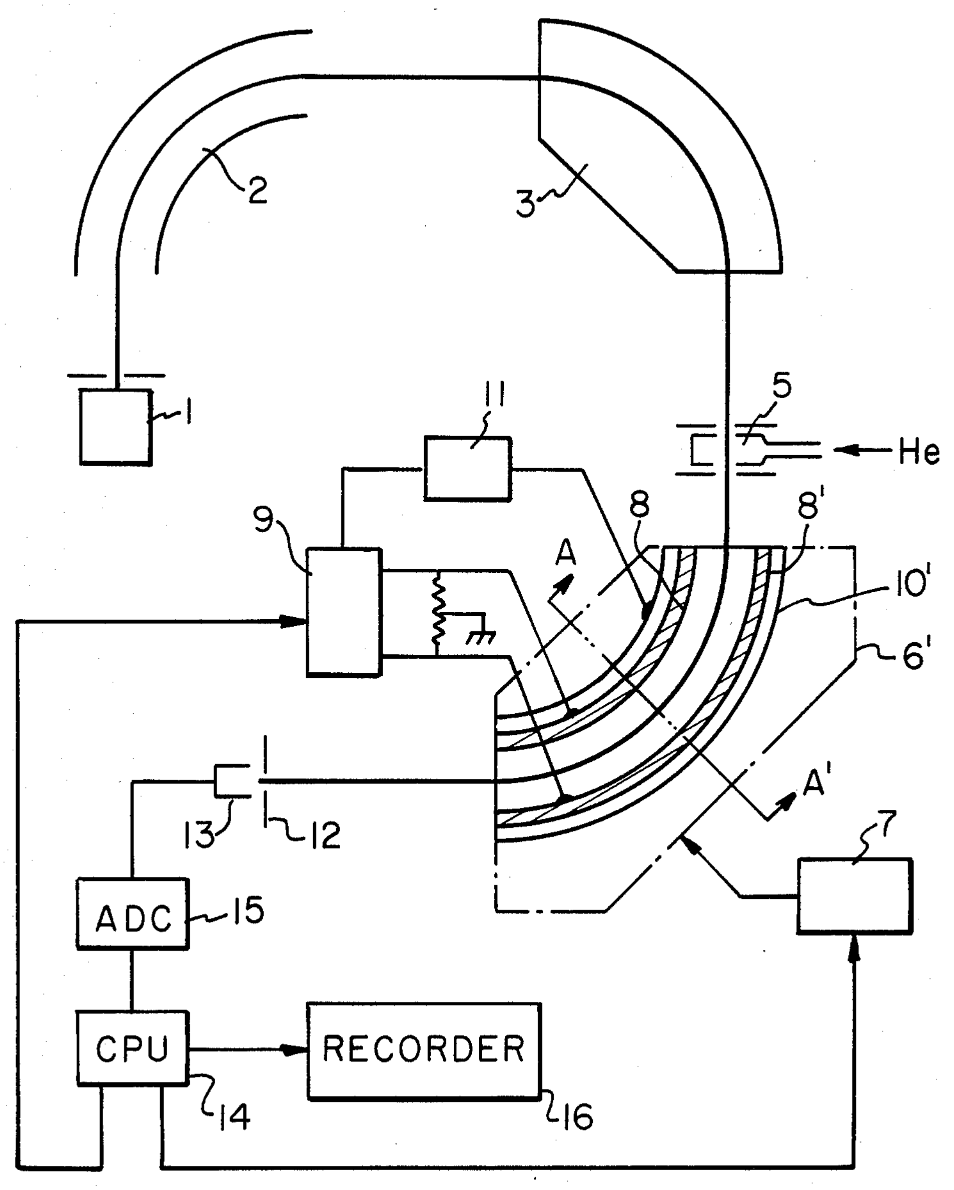
FIG. 1 shows one embodiment of this invention.
Figure 2:
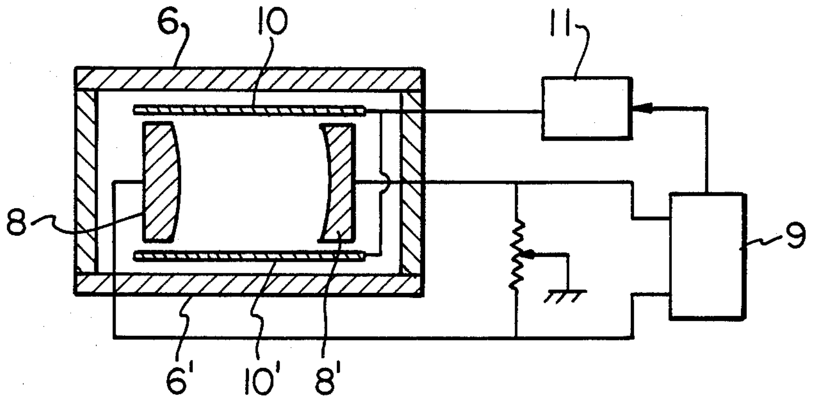
FIG. 2 shows a cross-sectional view of the embodiment shown in FIG. 1 through A—A.

Referring to FIG. 1 and FIG. 2, an ion source 1 produces and accelerates sample ions. The accelerated ions are selected according to their mass to charge ratio by a double-focussing mass spectrometer comprising an electric field 2 and a magnetic field 3. The mass-selected parent ions are directed to a collision chamber 5 in a field-free region. Helium gas is supplied to the collision chamber. Some of the parent ions collide with the helium gas and then form daughter ions by collision induced dissociation. The mixed ions including the remaining parent ions and the daughter ions are directed to a mass spectrometer having superimposed electric and magnetic fields. The details of this type of mass spectrometer are described in U.S. Pat. No. 4,054,796. This mass spectrometer comprises magnetic pole pieces 6 and 6' (see FIG. 2) which create the magnetic fields, electrodes 8 and 8' which create the toroidal electric field at almost right angles to said magnetic field, and two flat auxiliary electrodes 10 and 10' known as Matsuda plates which are arranged between said magnetic pole pieces 6 and 6' and interpose said electrodes 8 and 8'. The intensity of said magnetic field created between said pole pieces is changed by a power source 7. The intensity of electric field created by said electrodes is swept by a variable power source 9. A compensating voltage is fed into said auxiliary electrodes 10 and 10' from a power source 11, the compensating voltage being varied in proportion to the square of the sweep signal voltage from said sweep power source 9. There is a slit in baffle 12 beyond which an ion collector 13 is arranged. The ion collector output signal is fed into a computer 14 via an A-D converter 15. The computer 14 controls said power source 7 and 9 and carries out the data processing based on the ion collector output signals. The results of the data processing are fed into a recorder 16.

In the above described arrangement, the mixed ions, after being passed through the field-free region, are introduced into said superimposed field created by the pole pieces 6 and 6' and the electrodes 8 and 8'. The voltage fed into said electrodes from said variable power source 9 is swept under the first fixed intensity of the magnetic field. At that time, the compensating voltage proportional to the square of the sweep signal voltage from the power source 9 is applied to the auxiliary electrodes 10 and 10' from the power source 11. Accordingly, pursuant to the sweep of the electric field voltage of the superimposed field, focal length aberration is not produced over the entire superimposed field, and at each sweep value of the electric field, the ions introduced into the superimposed field are deflected in accordance with the m/e ratio, pass through the slit 12 and are detected by the ion collector 13. The detected signal is fed into the computer 14 via the A-D converter 15 and is memorized in accordance with the sweep voltage. After the first sweeping of the electric field voltage, the computer controls the power source 7 so as to change the intensity of the magnetic field created by the pole pieces 6 and 6'. Then the electric field voltage is swept again and the detected signals are fed into the computer 14 from the ion collector 13. The energy and mass of the daughter ions are obtained by the computer 14 and recorded by the recorder 16.

The present invention is characterized by equipping a mass spectrometer with a superimposed field, and makes it possible to determine both the mass and energy of the daughter ions by varying the strength of the magnetic field constituting the superimposed field into two stages and sweeping the m/e ratio by sweeping the voltage of the electric field constituting the superimposed field at each stage. Details should be made clear by the following description.

Figure 3:
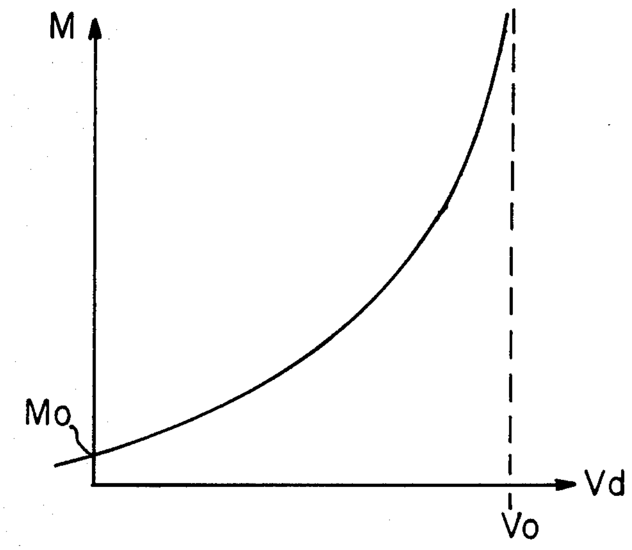
FIG. 3 shows the relation between Vd (the electric field voltage applied between electrodes 8 and 8') and M (mass to charge ratio of measured ions).

The basic relationship for a mass spectrometer with a superimposed field is $$M=M_o/(1-Vd/V_o)^2 \quad (1)$$

where M = the m/e ratio of the ions measured, Vd = the electric field voltage applied between electrodes 8 and 8', $M_o$ = the m/e ratio of the ions measured at Vd = 0 and $V_o$ = the electric field voltage for measuring the ions whose m/e ratio is $\infty$. FIG. 3 shows the relationship between Vd and M. Accordingly, by determining the relationship shown in FIG. 3 (in other words, determining the values of $V_o$ and $M_o$ in equation (1)) as a mass scale with reference to an appropriate standard sample, the m/e ratio corresponding to the value of Vd can be determined according to the mass scale.

However, it is a significant matter that even if accurate mass scale has been determined, when the accelerating voltage for ion beam or the strength of the magnetic field is varied afterwards, errors will appear from the mass scale.

Now, the following descriptions proceed on the basis of the above referenced subject-matter.

Here, it is assumed that parent ions $m_o^+$ whose m/e ratio is $m_o$ are selected by the double-focussing mass spectrometer consisting of electric field 2 and magnetic field 3, that a considerable number of the parent ions are dissociated into daughter ions $m_1^+$ and neutral particles having mass number $m_o$–$m_1$, and that the daughter ions $m_1^+$ and the parent ions $m_o^+$ not dissociated are introduced into the mass spectrometer employing a superimposed field.

Now, we investigate the m/e ratio of the detected ions when the voltage of the electric field of the superimposed field is swept under two cases: In case 1, the accelerating voltage is Va and the strength of the magnetic field consitituting the superimposed field is $H_o$. In case 2, the accelerating voltage is Va and the strength of the magnetic field is $H_o'$.

In case 1, $m_o$, the m/e ratio of the parent ions, is given according to the equation (1) as follows:

$$m_o=M_{oo}/(1-Vd_o/V_{oo})^2 \quad (2)$$

where $M_{oo}$ and $V_{oo}$ are the coefficients to give the mass scale under the condition (VA, $H_o$), $Vd_o$ is the electric field voltage at which the parent ions are detected.

Similarly, the m/e ratio of the daughter ions according to the mass scale of case 1($M_o=M_{oo}$, $V_o=v_{oo}$) is given as follows:

$$m_1=M_{oo}/(1-Vd_1/V_{oo})^2 \quad (3)$$

where $Vd_1$ is the electric field voltage at which the daughter ions are detected.

However, since the daughter ions have the kinetic energy eVa' as if they are accelerated by a different accelerating voltage Va' by means of energy fragmentation at the time of dissociation, the above calculated $m_1$ according to equation (3) is merely a virtual mass. The real m/e ratio of the daughter ions $m_1^+$ is given as follows:

$$m_1=M_{o1}/(1-Vd_1/V_{o1})^2 \quad (4)$$

where $M_{o1}$ and $V_{o1}$ are the coefficients to give the mass scale under the condition (Va', $H_o$).

Here, if K is assumed $$K=Va'/Va=m_1/m_o \quad (5)$$

$M_{o1}$ and $V_{o1}$ can be expressed as follows:

$$M_{o1}=M_{oo}/K \quad (6)$$

$$V_{o1}=K\ V_{oo} \quad (7)$$

However, since the value of kinetic energy fragmented at the time of dissociation is unknown, $M_{o1}$ and $V_{o1}$ cannot be determined. Accordingly, by eliminating $M_{o1}$ and $V_{o1}$ from equations (4), (5), (6), and (7), the following equations can be obtained.

$$m_1/K=m_o=M_{oo}/K^2(1-Vd_1/KV_{oo})^2 \quad (8)$$

Further, since equation (8) is equal to equation (2), the following relationship can be obtained.

$$Vd_1/V_{oo}=(K-1)+Vd_o/V_{oo} \quad (9)$$

On the other hand, in case 2 under the condition that the accelerating voltage is Va and $H_o$ is $H_{o'}$, *the m/e ratio of the parent ions is given similar to case* 1 *as follows*:

$$m_o=M_{oo}'/(1-Vd_o'/V_{oo}')^2 \quad (10)$$

where $M_{oo}'$ and $V_{oo}'$ are the coefficients to give the mass scale under the condition (Va, $H_o'$) and $Vd_o'$ is the electric field voltage at which the parent ions $m_o^+$ are detected. And assuming that $H_o'/H_o=A$, $M_{oo}'$ and $V_{oo}'$ are given as follows:

$$M_{oo}'=A^2M_{oo} \quad (11)$$

$$V_{oo}'=V_{oo} \quad (12)$$

Accordingly, by substituting equations (11) and (12) for equation (10) in order to eliminate $M_{oo}'$ and $V_{oo}'$, equation (10) can be rewritten as follows:

$$m_o=A^2M_{oo}/(1-Vd_o'/V_{oo})^2 \quad (10)$$

Further, according to the mass scale under the condition (Va', $H_o'$), the real m/e ratio of the daughter ions $m_1^+$ is given as follows:

$$m_1=M_{o1}'/(1-Vd_1'/V_{o1}')^2 \quad (13)$$

where $M_{o1}'$ and $V_{o1}'$ are the coefficients to give the mass scale under the condition (Va ', $H_o'$) and $Vd_1'$ is the electric field voltage at which the daughter ions are detected in case 2.

Here, $M_{o1}'$ and $V_{o1}'$ are expressed similar to equations (6) and (7) as follows:

$$M_{o1} = M_{oo}'/K \quad (14)$$

$$V_{o1}' = K\,V_{oo} \quad (15)$$

Accordingly, by eliminating $M_{o1}'$ and $V_{o1}'$ from equations (5), (13), (14) and (15), the following equation which corresponds to equation (8) can be obtained.

$$m_1/K = m_o = A^2 M_{oo}/K^2(1 - Vd_1'/KV_{oo})^2 \quad (16)$$

Since equation (16) is equal to equation (10)', the following equation which corresponds to equation (9) in case 1 can be obtained.

$$Vd_1'/V_{oo} = (K-1) + Vd_o'/V_{oo} \quad (17)$$

Here, since $m_o$ is unchangeable in either two cases, equations (2) and (10)' are equivalent. Accordingly, the following equation can be obtained.

$$Vd_o'/V_{oo} = A(Vd_o/V_{oo} - 1) + 1 \quad (18)$$

Further, by substituting equations (9) and (18) for equation (17) for eliminating $Vd_o'/V_{oo}$, the following equation is obtained.

$$Vd_1'/V_{oo} = K(1-A) + A\,Vd_1/V_{oo} \quad (19)$$

If K is assumed $$K = Va'/Va = m_1/m_o + \delta \quad (5)$$

where $\delta > 1$, the above equation (19) is also obtained.

Now, assuming that $M_{x1}$ is the virtual m/e ratio of the daughter ions detected in case 2, determined according to the mass scale of case 1, $M_{x1}$ is expressed as follows:

$$M_{x1} = M_{oo}/(1 - Vd_1'/V_{OO})^2 \quad (20)$$

Then, by substituting equation (19) for equation (20), the following equation is obtained.

$$M_{x1} = M_{oo}/[1 - (1-A)K - A\,Vd_1/V_{oo}]^2 \quad (21)$$

As will be understood from the above equation, $Vd_1'$ is eliminated in this equation. This means that the virtual m/e ratio of the daughter ions detected in case 2 can be given according to the mass scale established in case 1.

In equation (21), $M_{x1}$ and $Vd_1$ are obtained by practical measurement, $M_{oo}$ and $V_{oo}$ are determined in case 1. Accordingly, if A can be determined, then K is determined according to equation (21), next $m_1$ can be calculated according to equation (8).

It will be understood from the following description that it is possible to determine the value of A according to the mass scale established in case 1.

Now, assuming that $M_{xo}$ is the virtual m/e ratio of the parent ions detected in case 2, determined according to the mass scale of case 1 ($M_{oo}$, $V_{oo}$), $M_{xo}$ is expressed as follows:

$$M_{xo} = M_{oo}/(1 - Vd_o'/V_{oo})^2 \quad (22)$$

Then, the following equation is obtained by dividing equation (10)' by equation (22) as follows:

$$m_o/M_{xo} = A^2 \quad (23)$$

In equation (23), $m_o$ can be determined accurately according to equation (2) at case 1, and $M_{xo}$ can be obtained by practical measurement at case 2. Therefore, the value of A can be determined according to equation (23), subsequently, the value of K can be determined according to equation (21) by substituting the determined value of A. As a result, the value of $m_1$ can be determined according to equation (8) by substituting the determined value of K.

Furthermore, the value of energy which the daughter ions possess also can be calculated on the basis of the value of K=(eVa'/eVa).

To summarize, the exact m/e ratio of the daughter ions can be determined according to the folowing procedure:

(a) establishing the mass scale at case 1,
(b) in case 1, determining the m/e ratio $m_o$ of the parent ions according to said mass scale,
(c) in case 1, obtaining the electric field voltage $Vd_1$ at which the daughter ions are detected,
(d) in case 2, determining the virtual m/e ratio of the parent ions $M_{xo}$ *according to said mass scale,*
(e) in case 2, determining the virtual m/e ratio of the daughter ions $M_{x1}$ according to said mass scale,
(f) determining the value of A according to equation (23),
(g) determining the value of K according to equation (21),
(h) determining the value of $m_1$ according to equation (8), and
(i) determining the value of energy of the daughter ions on the basis of the value of K=(eVa'/eVa).

Numerous variations on the above-described invention will occur to one skilled in the art. For example, in case 2, the value of $H_o'$ may be chosen at zero. By so doing, since the value of A becomes to zero, calculation can be made easy. Regarding the mass spectrometer arranged in front of the colision chamber 5, any type of mass spectrometers may be adoptable.

In the above described embodiment, in order to compensate for aberration of the focal point pursuant to the electric field voltage sweep, a proper voltage is applied to the auxiliary electrodes called Matsuda plates along with the electric field voltage sweep. However, it is possible to use a lens for compensating for a focal distance without using auxiliary electrodes. In that case, a quadrupole lens is arranged outside the superimposed field. Further, in the above described embodiment, the ions dispersed by the superimposed field, which is created by the pole pieces 6 and 6' and the electrodes 8 and 8', are detected by the ion collector 13. However, it is possible to add an electric field or a superimposed field arranged in tandem with said superimposed field for correcting the increase in energy dispersion when measuring ions have high m/e ratio. The details of these arrangements are described in U.S. Pat. No. 4,054,796. Furthermore, in the measurement of the daughter ions formed by the self ion fragmentation reaction of the parent ions, the collision chamber is unnecessary.

Having thus described the invention with the details and particularity required by the Patent Laws, what is desired protected by Letters Patent is set forth in the following claims.

1. A mass spectrometer comprising an ion source, means for selecting ions produced and accelerated by said ion source according to their mass to charge ratio, a field-free region in which a part of the massselected parent ions form daughter ions, means for creating superimposed electric and magnetic fields at right angles through which parent and daughter ions passed through said field-free region pass, means for charging the intensity of said magnetic field from a first level to a second level, and means for sweeping the intensity of said electric field at both magnetic intensity levels.

2. A mass spectrometer according to claim 1 wherein one of said two levels of magnetic field intensity is zero.

3. A mass spectrometer according to claim 1 wherein a collision chamber is arranged in said field-free region and inert gas being fed into said collision chamber.

4. A process for measuring the kinetic energy and mass of daughter ions with a mass spectrometer comprising an ion source, means for selecting ions produced and accelerated by said ion source according to their mass to charge ratio, a field-free region in which a part of the massselected parent ions form daughter ions, means for creating superimposed electric and magnetic fields at right angles through which parent and daughter ions passed through said field-free region pass, comprising the steps for changing the intensity of said magnetic field from a first level to a second level and step for sweeping the intensity of said electric field at both magnetic intensity levels.

5. A process according to claim 4 wherein one of said levels of magnetic field intensity is zero.

6. A process according to claim 4 comprising the steps for (a) establishing a mass scale with the data gathered under the first level, (b) determining the m/e ratio $m_o$ of the parent ions according to said mass scale, (c) obtaining the electric field voltage $Vd_1$ at which the daughter ions are detected, (d) determining with the data gathered under the second level the virtual m/e ratio of the parent ions $M_{xo}$ according to said mass scale, (e) determining the virtual m/e ratio of the daugher ions $M_{x1}$ according to said mass scale, (f) determining the value of A according to the equation $$m_o/M_{xo}=A^2$$

(g) determining the value of K according to the equation $$M_{x1}=M_{oo}/[1-(1-A)K-A\,Vd_1/V_{oo}]^2,\ \text{and}$$

(h) determining the value of $m_1$ according to the equation $$m_1/K=m_o=M_{oo}/k^2(1-Vd_1/KV_{oo})^2.$$

* * * * *

UNITED STATES PATENT AND TRADEMARK OFFICE

CERTIFICATE OF CORRECTION

PATENT NO. : 4,521,687

DATED : June 4, 1985

INVENTOR(S) : Motohiro Naito

It is certified that error appears in the above-identified patent and that said Letters Patent is hereby corrected as shown below:

Claim 1 - Column 6 Line 68 "charging" should read --changing--.

Signed and Sealed this

*Eighth* Day of *October 1985*

[SEAL]

*Attest:*

DONALD J. QUIGG

*Attesting Officer*

*Commissioner of Patents and Trademarks—Designate*